US007327233B2

(12) United States Patent
Gerardiere

(10) Patent No.: US 7,327,233 B2
(45) Date of Patent: Feb. 5, 2008

(54) METHOD AND A DEVICE FOR LOCATING THE POSITION OF WHEELS OF A VEHICLE

(75) Inventor: Olivier Gerardiere, Tournefeuille (FR)

(73) Assignee: Siemens VDO Automotive, Toulouse (FR)

( * ) Notice: Subject to any disclaimer, the term of this patent is extended or adjusted under 35 U.S.C. 154(b) by 206 days.

(21) Appl. No.: 11/304,724

(22) Filed: Dec. 16, 2005

(65) Prior Publication Data
US 2006/0192661 A1 Aug. 31, 2006

(30) Foreign Application Priority Data
Feb. 16, 2005 (FR) .................................. 05 01533

(51) Int. Cl.
B60R 25/10 (2006.01)
G01C 9/00 (2006.01)
(52) U.S. Cl. ................................. 340/426.33; 702/150
(58) Field of Classification Search ........... 340/426.33, 340/447; 702/150, 29; 73/146.2
See application file for complete search history.

(56) References Cited
U.S. PATENT DOCUMENTS
6,871,157 B2 * 3/2005 Lefaure ..................... 702/150

6,888,446 B2 * 5/2005 Nantz et al. ................ 340/433

FOREIGN PATENT DOCUMENTS
WO    WO 02/051654    7/2002

* cited by examiner

Primary Examiner—Jeffery Hofsass
Assistant Examiner—Sigmund Tang
(74) Attorney, Agent, or Firm—Young & Thompson

(57) ABSTRACT

The invention relates to a method and a device for locating the position of wheels (2-5) of a vehicle (1). According to the invention, the vehicle (1) is equipped with transmit antennas (11-14) each disposed in such a way as to be positioned in proximity to a wheel (2-5) or to a pair of wheels (2-4, 3-5, 2-3, 4-5), and a locating procedure is implemented according to which, successively for each of the transmit antennas (11-14), the transmission, by said transmit antenna, of an identification request signal is instructed, and simultaneously with the transmission of said identification request signal, the transmission, by each of the antennas positioned in proximity to the other wheels, of a garbled signal designed to scramble the identification request signal is instructed.

18 Claims, 3 Drawing Sheets

Figure 1:
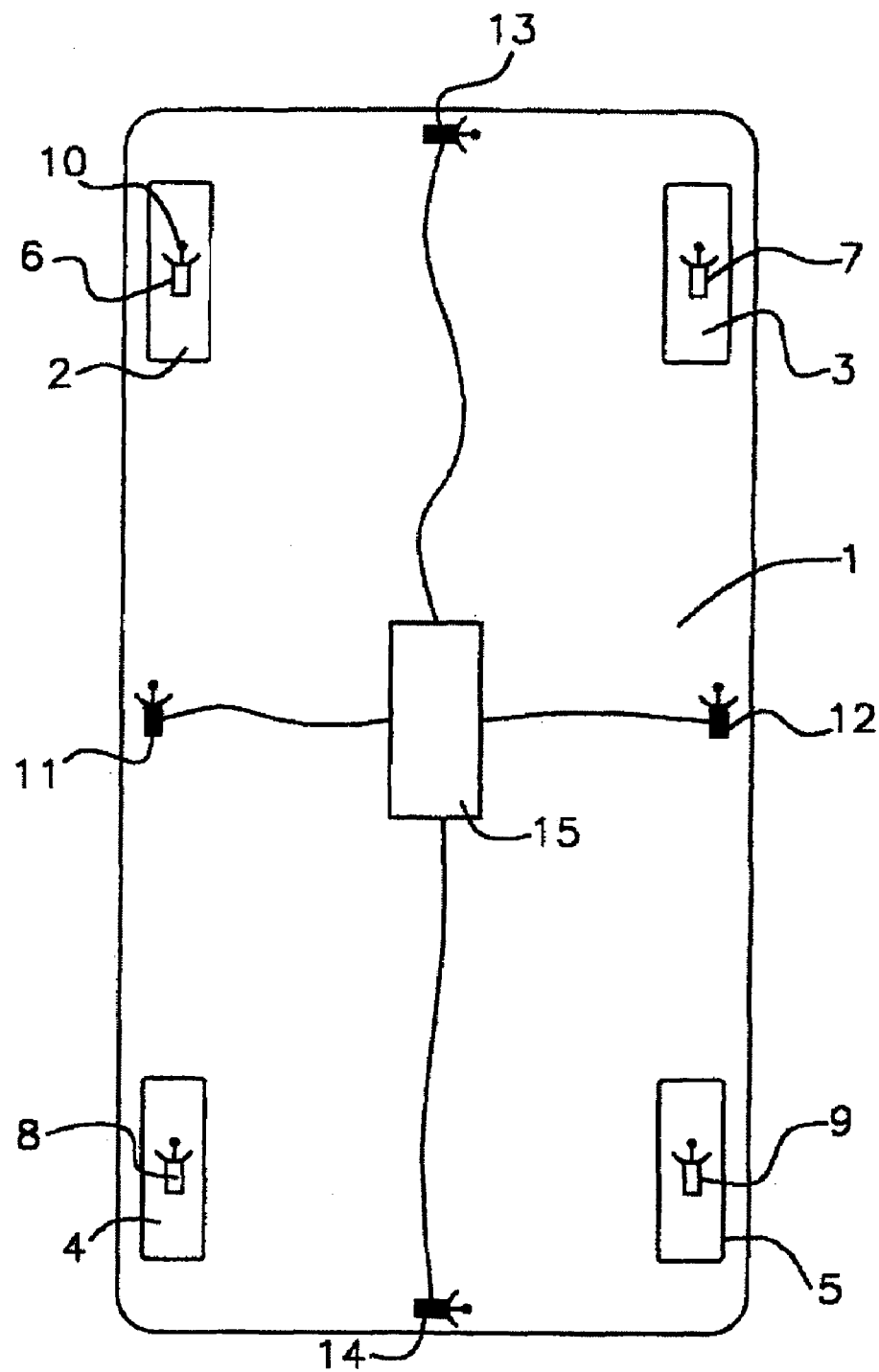

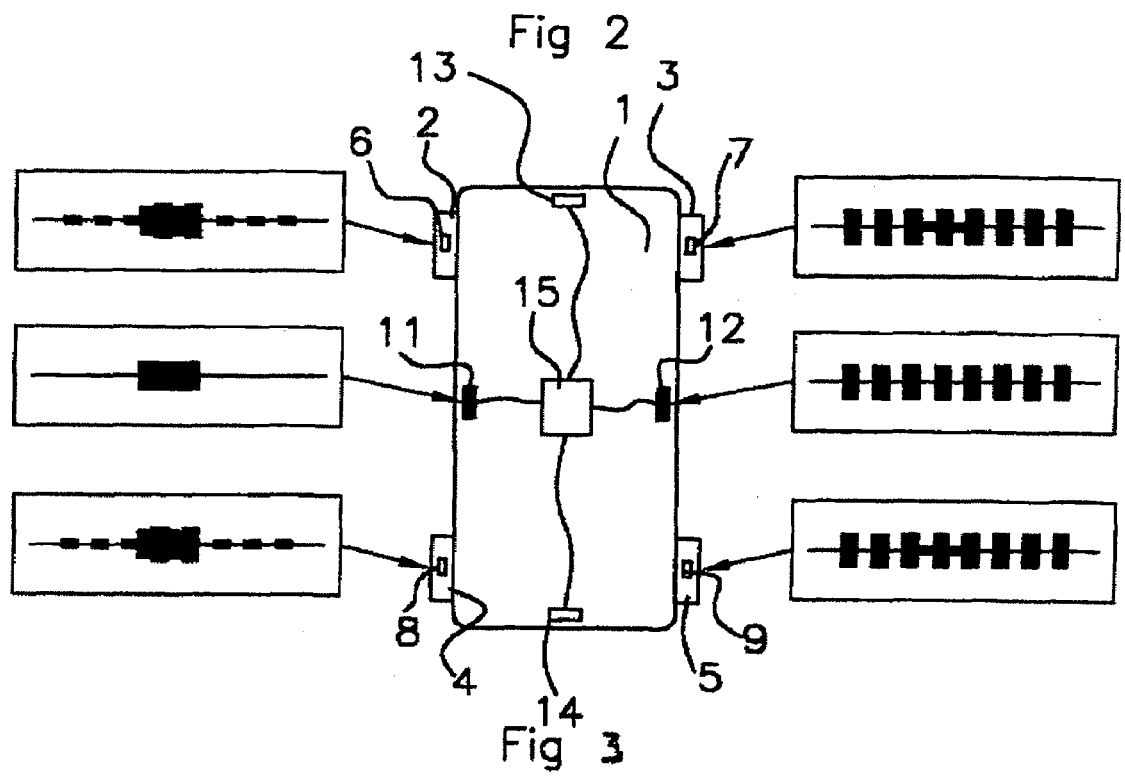
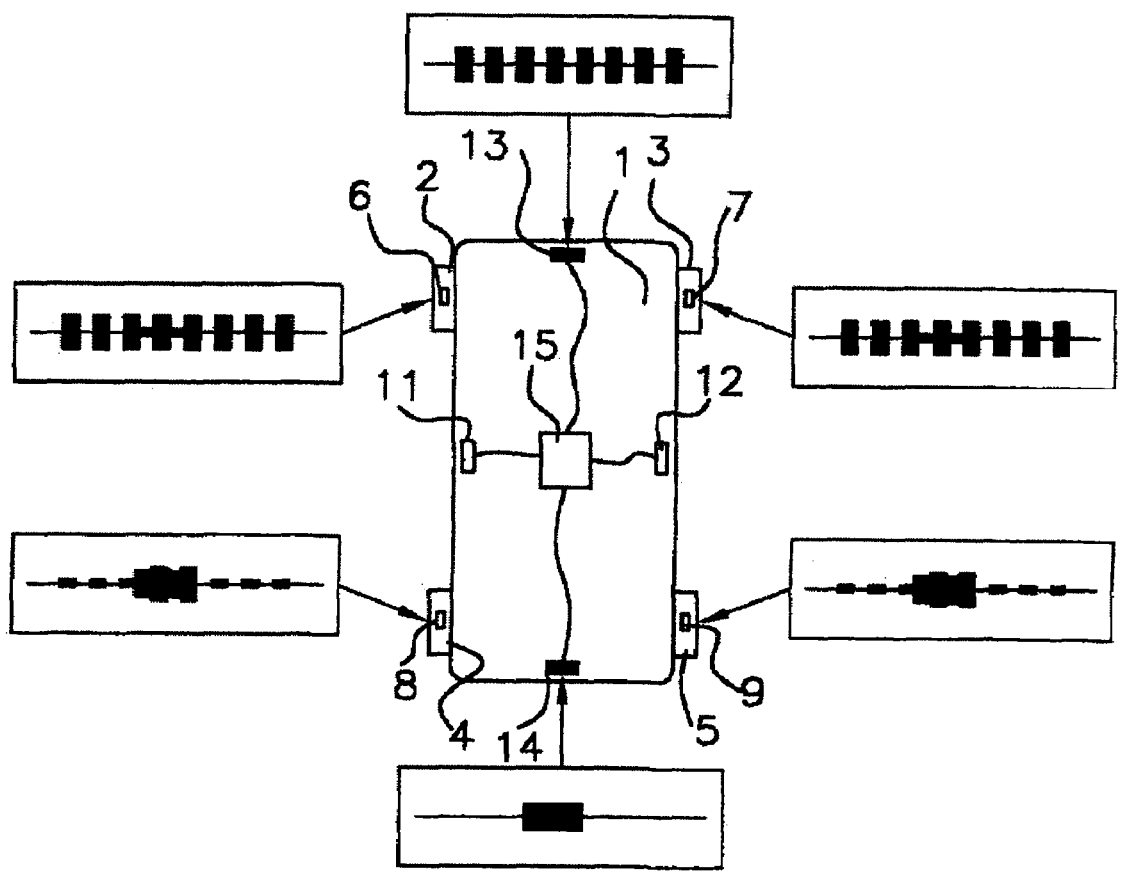

METHOD AND A DEVICE FOR LOCATING THE POSITION OF WHEELS OF A VEHICLE

The invention relates to a method and a device for locating the position of wheels of a vehicle, which wheels are equipped with an electronic box adapted so as to transmit, to a central unit mounted on the vehicle, signals representative of operating parameters of each wheel comprising, furthermore, a code for identifying the later.

Ever more motor vehicles possess, for security purposes, monitoring systems comprising sensors mounted on each of the wheels of the vehicle, which sensors are dedicated to the measurement of parameters, such as pressure or temperature of the tires with which these wheels are equipped, and which sensors are intended to inform the driver of any abnormal variation in the parameter measured.

These monitoring systems are conventionally fitted with a sensor mounted on each of the wheels of the vehicle and comprising a microprocessor and a radiofrequency transmitter (or RF transmitter), and with a central unit for receiving the signals transmitted by the transmitters, comprising a computer integrating a radiofrequency receiver (or RF receiver) connected to an antenna.

One of the problems that such monitoring systems require to solve resides in the necessity to have to associate with each signal received by the receiver of the central unit, an item of information relating to the location of the sensor and hence of the wheel from which this signal originates, this necessity enduring throughout the lifetime of the vehicle, that is to say having to be complied with even after changes of wheels or more simply inversions of the position of these wheels.

At the present time, a first locating process consists in using three low-frequency antennas each positioned in proximity to one of the wheels of the vehicle, and in performing a locating procedure consisting in successively exciting each of these three antennas through the emission of a low-frequency magnetic field.

According to this procedure, the sensor mounted on the wheel situated in proximity to the excited antenna instructs, in response and to the central unit, the transmission of a low-frequency signal comprising a code for identifying said sensor, in such a way that the successive excitation of the three antennas leads to the locating of the three sensors mounted on the wheels adjoining these antennas, and by deduction, to the locating of the fourth sensor.

The principal advantage of such a method resides in the fact that the locating procedure is very fast and leads to quasi-instantaneous locating after the starting of the vehicle.

On the other hand, this solution requires that the vehicle be equipped with three antennas with all the attendant encumbrances: connection cables, control amplifiers, etc., so that it turns out to be expensive.

This drawback relating to the cost of installing the means for implementing the locating method may be resolved when the vehicle is equipped with a hands-free access device intended to make it possible to access said vehicle and to start the latter.

Specifically, the solution then consists, as described in particular in patent application WO 02/051654, in using this hands-free access device's transmit antennas mounted on the vehicle to implement the procedure for locating the wheels.

As described in the aforesaid patent application, the implementation of this solution consists, for example, in instructing the transmission by the transmit antennas of an uncoded signal when said antennas are used with a view to the locating of the wheels, and in instructing the transmission of a coded signal during the use of the antennas for their original purpose of controlling access to the vehicle.

Such a solution which is in theory very appealing turns out on the other hand to be very tricky to implement in practice. Specifically, the antennas of the hands-free access devices are not positioned in an ideal manner with a view to allowing the locating of the wheels of a vehicle.

Therefore, the selective nature of this locating can be obtained only with the help of very accurate adjustments of the transmission power of the antennas, and generally requires that this transmission power be appreciably lowered and hence makes it necessary to work at the limit of sensitivity of the receivers mounted on the wheels.

However, in practice, these extreme conditions of adjustment frequently lead to problems of immunity to noise and of tolerance of sensitivity of the sensors, resulting in very relative reliability of the locating method.

The present invention aims to alleviate this drawback related to the lack of reliability of the locating method described above, and its principal objective is to provide a locating method which is very competitive in terms of reactivity and reliability.

Another objective of the invention is to provide a locating method, moreover requiring, with a view to its implementation, a simple software adaptation of the conventional hands-free access devices with which current vehicles are equipped.

For this purpose, the invention is aimed, firstly, at a method of locating the position of wheels of a vehicle, which wheels are equipped with an electronic box adapted so as to transmit, to a central unit mounted on the vehicle, signals representative of operating parameters of each wheel comprising, furthermore, a code for identifying the latter. According to the invention, this locating method is characterized in that:

the vehicle is equipped with transmit antennas each disposed in such a way as to be positioned in proximity to a wheel or to a pair of wheels, and the central unit and the electronic boxes are programmed in such a way as to implement a locating procedure according to which, successively for each of the transmit antennas:

the central unit instructs the transmission, by said transmit antenna, of an identification request signal on receipt of which the electronic box of each wheel positioned in proximity to this transmit antenna is adapted so as to transmit in response a signal comprising this wheel's identifying code, the central unit instructs, simultaneously with the transmission of the identification request signal, the transmission, by each of the antennas positioned in proximity to the other wheels, of a garbled signal designed to scramble the identification request signal.

According to the invention, this method may advantageously be implemented with a view to locating the position right or left of a wheel of a vehicle by equipping said vehicle with two transmit antennas disposed in such a way as to each be positioned in proximity respectively to the right wheels and to the left wheels.

This method may advantageously also be implemented with a view to locating the position front or rear of a wheel of a vehicle by equipping said vehicle with two transmit antennas disposed in such a way as to each be positioned in proximity respectively to the front wheels and to the rear wheels.

A combination of these two locating procedures right/left and front/rear leads, furthermore, advantageously to allowing the locating of the various wheels of a vehicle. For this purpose, the central unit is advantageously programmed in such a way as to implement successively, in any order, a procedure for locating the left wheels and right wheels in the course of which no signal is transmitted by the two antennas assigned to the locating of the front wheels and rear wheels and a procedure for locating the front wheels and rear wheels in the course of which no signal is transmitted by the two antennas assigned to the locating of the right wheels and left wheels.

According to the invention the selective nature of the locating procedure therefore results from the fact that, during the transmission of an identification request signal by an antenna, this signal can be identified only by the electronic box of the wheel or of the two wheels closest to said antenna.

Specifically, each of the electronic boxes with which the wheels are equipped receives a global signal composed of a superposition of the identification request signal transmitted by a transmit antenna and of the garbled signal transmitted by the other antenna or antennas.

However, concerning the electronic box of the wheel or of the two wheels closest to the antenna transmitting the identification request signal, this request signal is predominant with respect to the residual garbled signal. Consequently, the global signal received exhibits the general form of the identification request signal, and is therefore identified as being this request signal, bringing about the transmission in response of a signal comprising the wheel's identifying code.

The other electronic boxes receive, for their part, a global signal in which the garbled signal is predominant with respect to the residual identification request signal. Therefore, this global signal is not identifiable by said boxes which therefore transmit no signal in response.

The method according to the invention therefore necessitates no limitation of the transmission power of the transmit antennas, so that each reliability would not be affected by any problems of immunity to noise or of tolerance of sensitivity of the sensors.

One of the consequences stemming from the specific features of the method according to the invention resides in the possibility of advantage using the antennas of a hands-free access device with which a vehicle is equipped, adapted so as to make it possible to access said vehicle and/or to start the latter, with the help of a simple software adaptation of this hands-free access device.

It should be noted however that, with a view to the locating of the wheels of a vehicle, it is also conceivable, according to an advantageous variant embodiment, to equip the vehicle with transmit antennas disposed in such a way as to each be positioned in proximity to one of said wheels.

Moreover, in an advantageous manner according to the invention, the central unit is programmed so as to instruct the transmission of identification request signals consisting of "Manchester" coded signals.

The invention extends to a device for locating the position of wheels of a vehicle, which wheels are equipped with an electronic box adapted so as to transmit, to a central unit mounted on the vehicle, signals representative of operating parameters of each wheel comprising, furthermore, a code for identifying the latter. According to the invention, this locating device comprises:

transmit antennas each disposed in such a way as to be positioned in proximity to a wheel or to a pair of wheels, and a central unit programmed in such a way as to implement a locating procedure according to which, successively for each of the transmit antennas:

said central unit instructs the transmission, by said transmit antenna, of an identification request signal on receipt of which the electronic box of each wheel positioned in proximity to this transmit antenna is programmed so as to transmit in response a signal comprising this wheel's identifying code, said central unit instructs, simultaneously with the transmission of the identification request signal, the transmission, by each of the antennas positioned in proximity to the other wheels, of a garbled signal designed to scramble the identification request signal.

According to a first advantageous embodiment of the invention, the transmit antennas consist of the antennas of a hands-free device with which the vehicle is equipped, adapted so as to make it possible to access said vehicle and/or to start the latter.

As a variant, advantageously, the transmit antennas consist of antennas disposed in such a way as to be each positioned in proximity to one of the wheels of the vehicle.

Figure 4:
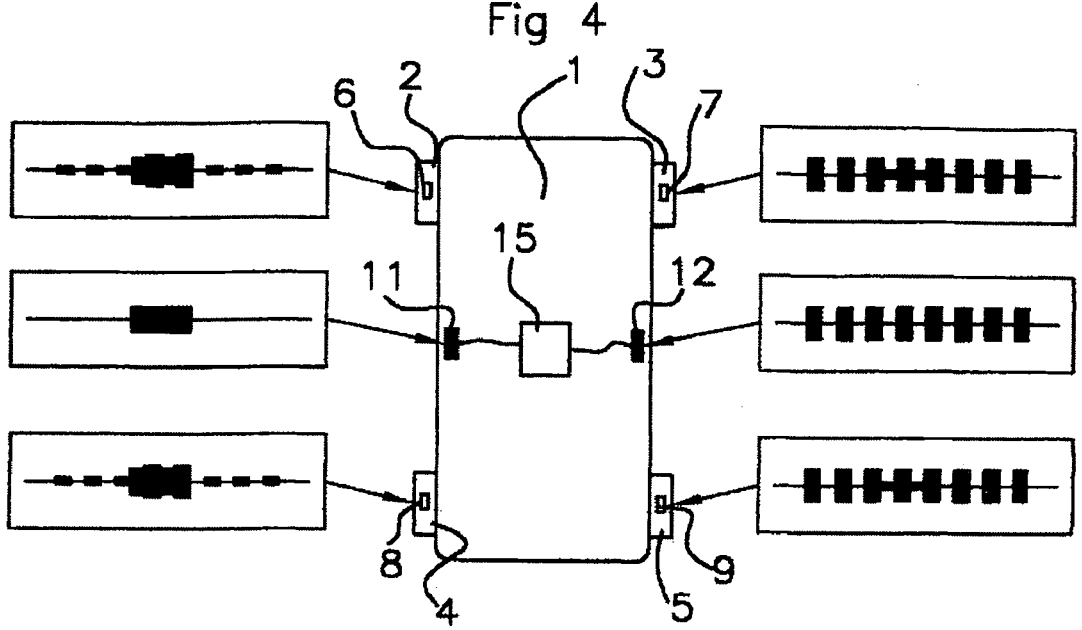
Figure 5:
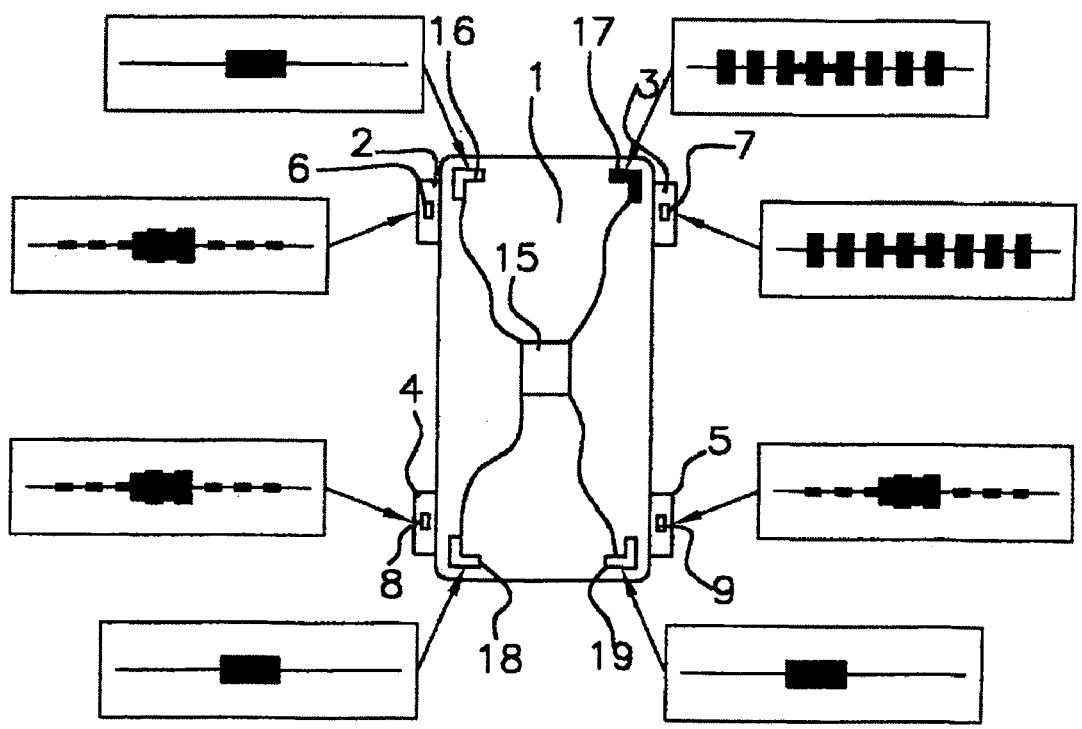

Other characteristics aims and advantages of the invention will emerge from the detailed description which follows with reference to the appended drawings which represent by way of nonlimiting examples thereof three preferred embodiments. In these drawings:

FIG. 1 is a schematic view from below of a vehicle fitted with a monitoring system associated with a device according to the invention for locating the four wheels of said vehicle, FIGS. 2 and 3 are diagrammatic views similar to that of FIG. 1, illustrating the successive locating steps implemented by the locating device represented in this FIG. 1, FIG. 4 is a diagrammatic view from below of a vehicle fitted with a monitoring system associated with a first variant device according to the invention, intended for locating the right and left wheels of said vehicle, this figure illustrating, moreover, the locating method implemented, and FIG. 5 is a diagrammatic view from below of a vehicle fitted with a monitoring system associated with a second variant device according to the invention for locating the four wheels of said vehicle, this figure illustrating, moreover, the locating method implemented.

The locating devices according to the invention, as are represented by way of examples in FIGS. 1, 4 and 5, are intended for locating the position of wheels of a vehicle.

These locating devices are more specifically intended to be installed on vehicles fitted with a monitoring system such as that, represented in the figures, equipping a vehicle 1 furnished with four wheels conventionally kitted out with tires: two front wheels 2, 3 and two rear wheels 4, 5.

Such monitoring systems conventionally comprise, firstly, associated with each wheel 2-5, an electronic box 6-9, for example built into the rim of said wheel in such a way as to be positioned inside the casing of the tire.

Each of these electronic boxes 6-9 integrates for example a sensor dedicated to the measurement of parameters, such as pressure and/or temperature of the tire, connected to a microprocessor possessing a code for identifying said sensor, and linked to an RF transmitter connected to an antenna such as the low-frequency one 10.

The monitoring system also comprises a centralized computer or central unit 15 comprising a microprocessor and integrating an RF receiver able to receive the signals transmitted by each of the four electronic boxes 6-9, and connected, for this purpose, to an antenna.

In customary fashion, such a monitoring system and in particular its central unit 15 are designed in such a way as to inform the driver of any abnormal variation in the parameters measured by the sensors associated with the wheels 2-5.

The locating device according to the invention comprises, in addition to the central unit 15, transmit antennas connected to said central unit 15 and each disposed in proximity to a wheel 2-5 or to a pair of wheels left 2, 4, right 3, 5 front 2, 3 or rear 4, 5.

According to the locating device represented in FIG. 1 these transmit antennas are four in number and are respectively disposed in proximity to the right pair of wheels 3, 5 ("right" antenna 12), to the left pair of wheels 2, 4 ("left" antenna 11), to the front pair of wheels 2, 3 ("front" antenna 13) and to the rear pair of wheels 4, 5 ("rear" antenna 14).

Advantageously according to the invention, these transmit antennas 11-14 consist of antennas of a device usually known by the name "hands-free device", adapted so as to make it possible to access vehicle 1 and to start the latter by virtue of the identification of an electronic tag.

In accordance with the provisions of such a hands-free access device, these antennas are therefore positioned respectively, for the left antenna 11 assigned to the left pair of wheels 2, 4: on the handle of the front left door of the vehicle, for the right antenna 12 assigned to the right pair of wheels 3, 5: on the handle of the front right door of the vehicle, for the front antenna 13 assigned to the front pair of wheels 2, 3: at the level of the dashboard of the vehicle, and for the rear antenna 14 assigned to the rear pair of wheels 4, 5: on the handle of the door of the trunk of the vehicle.

(It should be noted that in FIGS. 1 to 4 the position represented of the antennas does not correspond exactly to the actual position described hereinabove of the antennas on the vehicle; the objective of this representation is to clearly differentiate and highlight the respective "right, left, front and rear" positioning of said antennas).

As represented in FIGS. 2 and 3, the locating device of FIG. 1 is adapted so as to split the locating procedure into two successive steps, one making it possible to identify the left 2, 4 and right 3, 5 wheels of the vehicle, and the other to identify the front 2, 3 and rear 4, 5 wheels of said vehicle.

For each of these two steps two transmit antennas are alone used:
the two antennas left 11 and right 12 for the locating of the right and left wheels:
and the two antennas front 13 and rear 14 for the locating of the front and rear wheels.

For each of these two steps, moreover, the central unit 15 instructs, firstly:
a transmission, by one of the two transmit antennas, of an identification request signal on receipt of which the electronic boxes of the two wheels positioned in proximity to this transmit antenna are adapted so as to transmit in response a signal comprising the respective codes for identifying these wheels,
simultaneously with the transmission of the identification request signal, the transmission by the other transmit antenna of a garbled signal designed to scramble the identification request signal, and to render the signal received by the electronic boxes of the two wheels positioned in proximity to this transmit antenna unidentifiable, and consequently to render these two electronic boxes "silent".

Secondly, for each of the two steps, the central unit 15 inverts the previous role of the two transmit antennas, so that the two previously "silent" electronic boxes receive the identification request signal and transmit in response a signal comprising the respective codes for identifying the associated wheels, while the other two electronic boxes become "silent".

Concerning the exemplary embodiment represented in FIGS. 1 to 3, the first step of locating the left 2, 4 and right 3, 5 wheels thus consists, firstly, as represented in FIG. 2:

in instructing the transmission, by the right transmit antenna 12, of an identification request signal on receipt of which the electronic boxes 7, 9 of the two right wheels 3, 5 transmit in response a signal comprising the respective codes for identifying these wheels, simultaneously with the transmission of the identification request signal, the transmission by the left transmit antenna 11 of a garbled signal designed to scramble the identification request signal, and to render the signal received by the electronic boxes 6, 8 of the two left wheels 2, 4 unidentifiable, and consequently to render these two electronic boxes "silent". Specifically, these two boxes will not respond to the identification request signal since this signal is incomprehensible on account of the garbling thereof.

This first step consists, thereafter, as mentioned above, in inverting the role of the left 11 and right 12 transmit antennas, so as to induce the electronic boxes 6, 8 of the two left wheels 2, 4 to transmit a signal comprising the respective codes for identifying said left wheels.

It should be noted that the order of the two substeps described hereinabove has no influence so that it may be inverted without the right/left locating procedure being affected thereby.

According to a same principle, still regarding the exemplary embodiment represented in FIGS. 1 to 3, the second step of locating the front 2, 3 and rear 4, 5 wheels consists for its part, secondly, as represented in FIG. 3:

in instructing the transmission, by the front transmit antenna 13, of an identification request signal on receipt of which the electronic boxes 6, 7 of the two front wheels 2, 3 transmit in response a signal comprising the respective codes for identifying these wheels, simultaneously with the transmission of the identification request signal, the transmission by the rear transmit antenna 14 of a garbled signal designed to scramble the identification request signal, and to render the signal received by the electronic boxes 8, 9 of the two rear wheels 4, 5 unidentifiable, and consequently to render these two electronic boxes "silent".

This second step consists, thereafter, as stated above, in inverting the role of the front 13 and rear 14 transmit antennas, in such a way as to induce the electronic boxes 8, 9 of the two rear wheels 4, 5 to transmit a signal comprising the respective codes of identifying said rear wheels.

Once these two locating steps have been performed, the central unit 15 thus possesses all the information for locating all the wheels 2-4 of the vehicle and for allocating an identification code to each of said wheels.

FIG. 4 represents a vehicle 1 equipped simply with two antennas left 11 and right 12, and its objective is to highlight that the invention may possibly be implemented with a view to merely locating the left 2, 4 and right 3, 5 wheels, such as represented in this figure, or, in the same manner, with a view to the locating of the front 2, 3 and rear 4, 5 wheels of a vehicle 1.

According to this second exemplary embodiment, the right/left locating procedure is similar to that implemented in the first step of the global locating method described hereinabove.

By way of variant the vehicle could also be equipped with two lateral antennas (left-right) and with a trunk antenna (rear).

FIG. 5 represents for its part a third embodiment of a locating device according to the invention, comprising four transmit antennas 16-19 each disposed in proximity to one of the wheels 2-5 of the vehicle 1.

As represented in this figure, according to this embodiment, the global locating of the wheels 2-5 of the vehicle 1 is effected in four successive similar steps each consisting:

in instructing the transmission, by a transmit antenna (front right antenna 17 in FIG. 5), of an identification request signal on receipt of which the electronic box 7 of the wheel 3 situated in proximity to this transmit antenna (front right wheel 3 in FIG. 5) transmits in response a signal comprising the respective code for identifying this wheel, simultaneously with the transmission of the identification request signal, the transmission by the other three transmit antennas (front left antenna 16, rear left antenna 18 and rear right antenna 19 according to FIG. 5) of a garbled signal designed to scramble the identification request signal, and to render the signal received by the electronic boxes 6, 8, 9 of the other three wheels (front left wheel 2, rear left wheel 4 and rear right wheel 5 according to FIG. 5) unidentifiable, and consequently to render these three electronic boxes "silent".

Lastly according to the invention, and as represented in FIGS. 2 to 5, the identification request signals consist, preferably, of "Manchester" coded signals, but the invention is not limited to signals of this type.

The garbled signals designed to scramble these identification request signals consist, for their part, as represented in FIGS. 2 to 5, of signals comprising a portion of modulated signal of greater length than the aggregate length of two successive binary elements of a "Manchester" coded signal.

The locating devices according to the invention therefore make it possible to rapidly and reliably locate the wheels of a vehicle, the locating procedures requiring, moreover, according to advantageous embodiments, only a simple software adaptation of the hands-free access devices with which current vehicles are equipped.

The invention claimed is:

1. A method of locating the position of wheels (2-5) of a vehicle (1), which wheels are equipped with an electronic box (6-9) adapted so as to transmit, to a central unit (15) mounted on the vehicle (1), signals representative of operating parameters of each wheel comprising, furthermore, a code for identifying the latter, said locating method being characterized in that:

the vehicle (1) is equipped with transmit antennas (11-14; 16-19) each disposed in such a way as to be positioned in proximity to a wheel (2-5) or to a pair of wheels ((2, 4), (3, 5) (2, 3), (4, 5)), and the central unit (15) and the electronic boxes (6-9) are programmed in such a way as to implement a locating procedure according to which, successively for each of the transmit antennas (11-14; 16-19):

the central unit (15) instructs the transmission, by said transmit antenna, of an identification request signal on receipt of which the electronic box (6-9) of each wheel (2-5) positioned in proximity to this transmit antenna is adapted so as to transmit in response a signal comprising this wheel's identifying code, the central unit (15) instructs, simultaneously with the transmission of the identification request signal, the transmission, by each of the antennas positioned in proximity to the other wheels, of a garbled signal designed to scramble the identification request signal.

2. The method as claimed in claim 1 for locating the position right or left of a wheel (2-5) of a vehicle (1) characterized in that said vehicle is equipped with two transmit antennas (11, 12) disposed in such a way as to each be positioned in proximity respectively to the left wheels (2, 4) and to the right wheels (3, 5).

3. The method as claimed in claim 1 for locating the position front or rear of a wheel (2-5) of a vehicle (1) characterized in that said vehicle is equipped with two transmit antennas (13, 14) disposed in such a way as to each be positioned in proximity respectively to the front wheels (2, 3) and to the rear wheels (4, 5).

4. The method as claimed in claim 2 taken together for locating the wheels of a vehicle, characterized in that the central unit (15) is programmed in such a way as to implement successively, in any order, a procedure for locating the left wheels (2, 4) and right wheels (3, 4) in the course of which no signal is transmitted by the two antennas (13, 14) assigned to the locating of the front wheels (2, 3) and rear wheels (4, 5) and a procedure for locating the front wheels (2, 3) and rear wheels (4, 5) in the course of which no signal is transmitted by the two antennas (11, 12) assigned to the locating of the left wheels (2, 4) and right wheels (3, 5).

5. The method of locating as claimed in claim 2, characterized in that during the locating procedure, the antennas (11-14) of a handsfree access device with which the vehicle (1) is equipped, adapted so as to make it possible to access said vehicle and/or to start the latter, are used.

6. The method as claimed in claim 1 for locating the wheels (2-5) of a vehicle (1), characterized in that said vehicle is equipped with transmit antennas (16-19) disposed in such a way as to each be positioned in proximity to one of said wheels.

7. The method of locating as claimed in claim 1, characterized in that the central unit (15) is programmed so as to instruct the transmission of identification request signals consisting of "Manchester" coded signals.

8. A device for locating the position of wheels (2-5) of a vehicle (1), which wheels are equipped with an electronic box (6-9) adapted so as to transmit, to a central unit (15) mounted on the vehicle (1), signals representative of operating parameters of each wheel comprising, furthermore, a code for identifying the latter, said locating device being characterized in that it comprises, transmit antennas (11-14; 16-19) each disposed in such a way as to be positioned in proximity to a wheel (2-5) or to a pair of wheels ((2, 4), (3, 5), (2, 3), (4, 5)), and a central unit (15) programmed in such a way as to implement a locating procedure according to which, successively for each of the transmit antennas (11-14; 16-19):

said central unit instructs the transmission, by said transmit antenna, of an identification request signal on receipt of which the electronic box (6-9) of each wheel (2-5) positioned in proximity to this transmit antenna is programmed so as to transmit in response a signal comprising this wheel's identifying code, said central unit instructs, simultaneously with the transmission of the identification request signal, the transmission, by each of the antennas positioned in proximity to the other wheels, of a garbled signal designed to scramble the identification request signal.

9. The locating device as claimed in claim 8, characterized in that the transmit antennas (11-14) consist of the antennas of a hands-free device with which the vehicle (1) is equipped, adapted so as to make it possible to access said vehicle and/or to start the latter.

10. The locating device as claimed in claim 8, characterized in that the transmit antennas (16-19) consist of antennas disposed in such a way as to be each positioned in proximity to one of the wheels (2-5) of the vehicle (1).

11. The method as claimed in claim 3 taken together for locating the wheels of a vehicle, characterized in that the central unit (15) is programmed in such a way as to implement successively, in any order, a procedure for locating the left wheels (2, 4) and right wheels (3, 4) in the course of which no signal is transmitted by the two antennas (13, 14) assigned to the locating of the front wheels (2, 3) and rear wheels (4, 5) and a procedure for locating the front wheels (2, 3) and rear wheels (4, 5) in the course of which no signal is transmitted by the two antennas (11, 12) assigned to the locating of the left wheels (2, 4) and right wheels (3, 5).

12. The method of locating as claimed in claim 3, characterized in that during the locating procedure, the antennas (11-14) of a handsfree access device with which the vehicle (1) is equipped, adapted so as to make it possible to access said vehicle and/or to start the latter, are used.

13. The method of locating as claimed in claim 4, characterized in that during the locating procedure, the antennas (11-14) of a handsfree access device with which the vehicle (1) is equipped, adapted so as to make it possible to access said vehicle and/or to start the latter, are used.

14. The method of locating as claimed in claim 2, characterized in that the central unit (15) is programmed so as to instruct the transmission of identification request signals consisting of "Manchester" coded signals.

15. The method of locating as claimed in claim 3, characterized in that the central unit (15) is programmed so as to instruct the transmission of identification request signals consisting of "Manchester" coded signals.

16. The method of locating as claimed in claim 4, characterized in that the central unit (15) is programmed so as to instruct the transmission of identification request signals consisting of "Manchester" coded signals.

17. The method of locating as claimed in claim 5, characterized in that the central unit (15) is programmed so as to instruct the transmission of identification request signals consisting of "Manchester" coded signals.

18. The method of locating as claimed in claim 6, characterized in that the central unit (15) is programmed so as to instruct the transmission of identification request signals consisting of "Manchester" coded signals.

* * * * *